US00RE46811E

(19) United States
(12) Reissued Patent
Jankovsky et al.

(10) Patent Number: US RE46,811 E
(45) Date of Reissued Patent: *Apr. 24, 2018

(54) PASSIVE DIRECTIONAL ACOUSTIC RADIATING

(71) Applicant: Bose Corporation, Framingham, MA (US)

(72) Inventors: Joseph Jankovsky, Holliston, MA (US); Eric S. Johanson, Millbury, MA (US); Richard Saffran, Southborough, MA (US)

(73) Assignee: Bose Corporation, Framingham, MA (US)

( * ) Notice: This patent is subject to a terminal disclaimer.

(21) Appl. No.: 14/675,034

(22) Filed: Mar. 31, 2015

Related U.S. Patent Documents

Reissue of:
(64) Patent No.: 8,447,055
Issued: May 21, 2013
Appl. No.: 12/854,982
Filed: Aug. 12, 2010

U.S. Applications:
(63) Continuation-in-part of application No. 12/114,261, filed on May 2, 2008, now Pat. No. 8,351,630.

(51) Int. Cl.
*H04R 1/02* (2006.01)
*H04R 1/34* (2006.01)
*H04R 1/28* (2006.01)

(52) U.S. Cl.
CPC ..... *H04R 1/345* (2013.01); *H04R 1/2819* (2013.01)

(58) Field of Classification Search
CPC .... H04R 1/345; H04R 1/2819; H04R 1/2853; H04R 1/2857; H04R 1/2823
(Continued)

(56) References Cited

U.S. PATENT DOCUMENTS 582,147 A 5/1897 Riley
1,387,490 A 8/1921 Humes
(Continued)

FOREIGN PATENT DOCUMENTS

EP 0608937 A1 8/1994
EP 1487233 A1 12/2004
(Continued)

OTHER PUBLICATIONS

CN OA dated Aug. 27, 2010 for CN Appln. No. 200710089694.0.
(Continued)

*Primary Examiner* — Kenneth J Whittington
(74) *Attorney, Agent, or Firm* — Brian M. Dingman; Dingman IP Law, PC

(57) ABSTRACT

An audio system for a television using a pipe type passive directional acoustic device mounted in a television cabinet. The slotted pipe type passive directional acoustic device includes a first acoustic driver, acoustically coupled to a pipe to radiate acoustic energy into the pipe. The first pipe includes an elongated opening along at least a portion of the length of the pipe. Acoustically resistive material is in the opening. Pressure waves are radiated to the environment through the opening. The pressure waves are characterized by a volume velocity. The pipe, the opening, and the acoustically resistive material are configured so that the volume velocity is substantially constant along the length of the pipe. The passive directional acoustic devices directionally radiate sound waves laterally from the television cabinet.

11 Claims, 13 Drawing Sheets

(58) Field of Classification Search
USPC ..... 181/148, 153, 155, 156, 190, 199, 211; 381/386, 387, 391
See application file for complete search history.

(56) References Cited

U.S. PATENT DOCUMENTS

| | | | | |
|---|---|---|---|---|
| 1,577,880 | A | 3/1926 | Stuart | |
| 1,840,992 | A | 1/1932 | Weitling | |
| 2,225,312 | A | 12/1940 | Mason | |
| 2,318,535 | A | 5/1943 | Spivak | |
| 2,566,094 | A | 8/1951 | Olson et al. | |
| 2,739,659 | A | 3/1956 | Daniels | |
| 2,789,651 | A | 4/1957 | Daniels | |
| 2,856,022 | A | 10/1958 | Kurtze et al. | |
| 2,913,680 | A | 11/1959 | Porter et al. | |
| 2,939,922 | A | 6/1960 | Gorike | |
| 3,174,578 | A | 3/1965 | Kojima | |
| 3,381,773 | A | 5/1968 | Schenkel | |
| 3,517,390 | A | 6/1970 | Whitehead | |
| 3,555,956 | A | 1/1971 | Martin | |
| 3,657,490 | A | 4/1972 | Scheiber | |
| 3,930,560 | A | 1/1976 | Carlson et al. | |
| 3,944,757 | A | 3/1976 | Tsukamoto | |
| 3,978,941 | A | 9/1976 | Siebert | |
| 4,171,734 | A | 10/1979 | Peveto et al. | |
| 4,251,686 | A | 2/1981 | Sokolich | |
| 4,297,538 | A | 10/1981 | Massa | |
| 4,325,454 | A * | 4/1982 | Humphrey | H04R 1/2819 181/145 |
| 4,340,787 | A | 7/1982 | Gorike | |
| 4,373,606 | A | 2/1983 | Clements et al. | |
| 4,421,957 | A | 12/1983 | Wallace, Jr. | |
| 4,546,459 | A | 10/1985 | Congdon | |
| 4,586,194 | A | 4/1986 | Kohashi et al. | |
| 4,616,731 | A | 10/1986 | Robinson | |
| 4,646,872 | A | 3/1987 | Kamon et al. | |
| 4,706,295 | A | 11/1987 | Putnam et al. | |
| 5,022,486 | A | 6/1991 | Miura et al. | |
| 5,109,422 | A | 4/1992 | Furukawa | |
| 5,137,110 | A | 8/1992 | Bedard, Jr. et al. | |
| 5,170,435 | A | 12/1992 | Rosen et al. | |
| 5,187,333 | A | 2/1993 | Adair | |
| 5,276,740 | A | 1/1994 | Inanaga et al. | |
| 5,325,435 | A | 6/1994 | Date et al. | |
| 5,552,569 | A * | 9/1996 | Sapkowski | H04R 1/2865 181/151 |
| 5,792,000 | A | 8/1998 | Weber et al. | |
| 5,793,000 | A | 8/1998 | Sabato et al. | |
| 5,854,450 | A | 12/1998 | Kent | |
| 5,898,137 | A | 4/1999 | Saito | |
| 5,929,392 | A | 7/1999 | Sabato et al. | |
| 5,956,411 | A | 9/1999 | Edgar | |
| 6,005,952 | A | 12/1999 | Klippel | |
| 6,411,718 | B1 | 6/2002 | Danley et al. | |
| 7,426,280 | B2 | 9/2008 | Aylward | |
| 7,536,024 | B2 | 5/2009 | Bailey et al. | |
| 7,747,033 | B2 | 6/2010 | Uchimura | |
| 7,751,582 | B2 * | 7/2010 | Akino | 381/337 |
| D621,439 | S | 8/2010 | Hamanaga | |
| 7,826,633 | B2 | 11/2010 | Davi | |
| 7,833,282 | B2 | 11/2010 | Mandpe | |
| 7,835,537 | B2 | 11/2010 | Cheney | |
| 7,848,535 | B2 | 12/2010 | Akino | |
| 8,066,095 | B1 | 11/2011 | Bromer | |
| 8,175,311 | B2 | 5/2012 | Aylward | |
| 8,351,630 | B2 | 1/2013 | Ickler et al. | |
| 8,358,798 | B2 * | 1/2013 | Ickler | H04R 1/345 381/346 |
| 2003/0095672 | A1 | 5/2003 | Hobelsberger | |
| 2003/0164820 | A1 | 9/2003 | Kent | |
| 2004/0105559 | A1 | 6/2004 | Aylward et al. | |
| 2005/0013457 | A1 | 1/2005 | Sheplak et al. | |
| 2005/0205348 | A1 | 9/2005 | Parker et al. | |
| 2005/0205349 | A1 | 9/2005 | Parker et al. | |
| 2005/0254681 | A1 | 11/2005 | Bailey et al. | |
| 2006/0274913 | A1 | 12/2006 | Akino | |
| 2006/0285714 | A1 | 12/2006 | Akino | |
| 2007/0086606 | A1 | 4/2007 | Goodwin | |
| 2007/0233036 | A1 | 10/2007 | Mandpe | |
| 2007/0274547 | A1 * | 11/2007 | Ueno | H04N 5/642 381/306 |
| 2007/0286427 | A1 | 12/2007 | Jung et al. | |
| 2008/0152181 | A1 | 6/2008 | Parker et al. | |
| 2008/0232197 | A1 | 9/2008 | Kojima et al. | |
| 2009/0003613 | A1 | 1/2009 | Christensen | |
| 2009/0016555 | A1 | 1/2009 | Lynnworth | |
| 2009/0208047 | A1 | 8/2009 | Ngia et al. | |
| 2009/0209304 | A1 | 8/2009 | Ngia et al. | |
| 2009/0214066 | A1 | 8/2009 | Parker et al. | |
| 2009/0226004 | A1 | 9/2009 | Sorensen | |
| 2009/0238384 | A1 * | 9/2009 | Beauchamp | H04S 3/00 381/306 |
| 2009/0252363 | A1 | 10/2009 | Ickler | |
| 2009/0274313 | A1 | 11/2009 | Klein et al. | |
| 2009/0323995 | A1 | 12/2009 | Sibbald | |
| 2010/0092019 | A1 | 4/2010 | Hoefler et al. | |
| 2010/0224441 | A1 | 9/2010 | Fujimori et al. | |
| 2011/0026744 | A1 | 2/2011 | Jankovsky et al. | |
| 2011/0028986 | A1 | 2/2011 | Mandpe | |
| 2011/0096950 | A1 | 4/2011 | Rougas et al. | |
| 2011/0206228 | A1 | 8/2011 | Shiozawa et al. | |
| 2011/0219936 | A1 | 9/2011 | Masuda et al. | |
| 2011/0305359 | A1 | 12/2011 | Ikeda et al. | |
| 2012/0039475 | A1 | 2/2012 | Berardi et al. | |
| 2012/0057736 | A1 | 3/2012 | Shiozawa et al. | |
| 2012/0121118 | A1 | 5/2012 | Fregoso et al. | |

FOREIGN PATENT DOCUMENTS

| | | | |
|---|---|---|---|
| EP | 1921890 | A2 | 5/2008 |
| EP | 2099238 | A1 | 9/2009 |
| EP | 2104375 | A2 | 9/2009 |
| FR | 844769 | A | 8/1939 |
| GB | 22965 | | 10/1908 |
| GB | 190822965 | A | 12/1908 |
| GB | 310493 | A | 1/1930 |
| GB | 1159613 | A | 7/1969 |
| GB | 2100551 | A | 12/1982 |
| JP | 55165097 | A | 12/1980 |
| JP | 4-336795 | A | 11/1992 |
| JP | 2007037058 | A | 2/2007 |
| WO | 2004075601 | A1 | 9/2004 |
| WO | 2007007083 | A1 | 1/2007 |
| WO | 2009105313 | A1 | 8/2009 |
| WO | 2009134591 | A1 | 11/2009 |

OTHER PUBLICATIONS

JP OA dated Dec. 13, 2011 for JP Appln. No. 2010-546815.

English Translation of Abstract for JP Patent 336975, published Nov. 24, 1992.

Harrell, Jefferson, "Constant Beamwidth One-Octave Bandwidth End-Fire Line Array Loudspeakers", JAES vol. 43, No. 7/8, Jul./Aug. 1995.

International Search Report and Written Opinion dated Feb. 3, 2012 for PCT US2011/052347.

Australian Examiner's first report on Australian Patent Application 2009215768, dated Jan. 20, 2012.

Second Chinese Office Action on Chinese Patent Application 200710089694.0, dated Feb. 13, 2012.

International Search Report and Written Opinion dated Nov. 2, 2011 for PCT/US2011/047429.

Backgrounder; Technical Overview: Zenith/Bose Television Sound System, Summer/Fall 1986, Zenith Electronics Corporation, 1000 Milwaukee Avenue, Glenview, Illinois 60025, 8 pages.

International Search Report and Written Opinion dated Apr. 27, 2011 for PCT/US2011/024674.

First Chinese Office Action dated Dec. 31, 2012 for Chinese Patent Application No. 200980114910.X.

(56) References Cited

OTHER PUBLICATIONS

International Preliminary Report on Patentability dated Feb. 21, 2013 for PCT/US2011/047429.

* cited by examiner

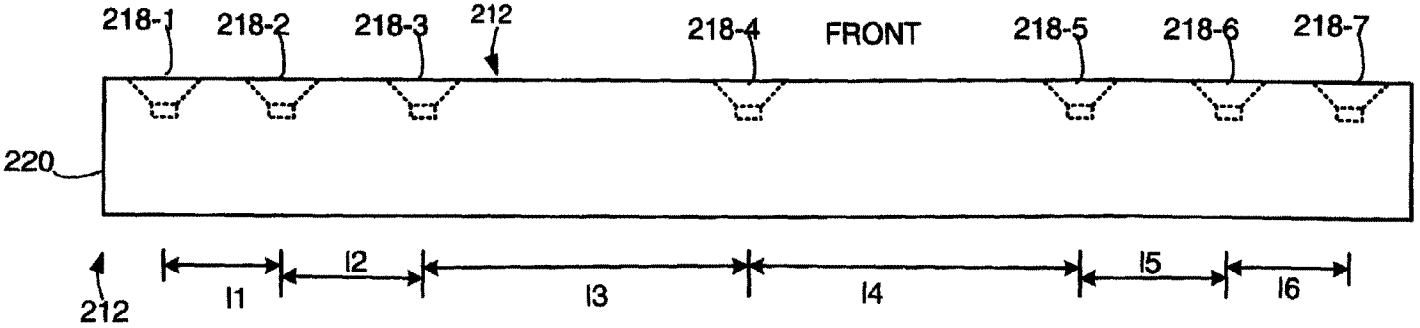
Fig. 5
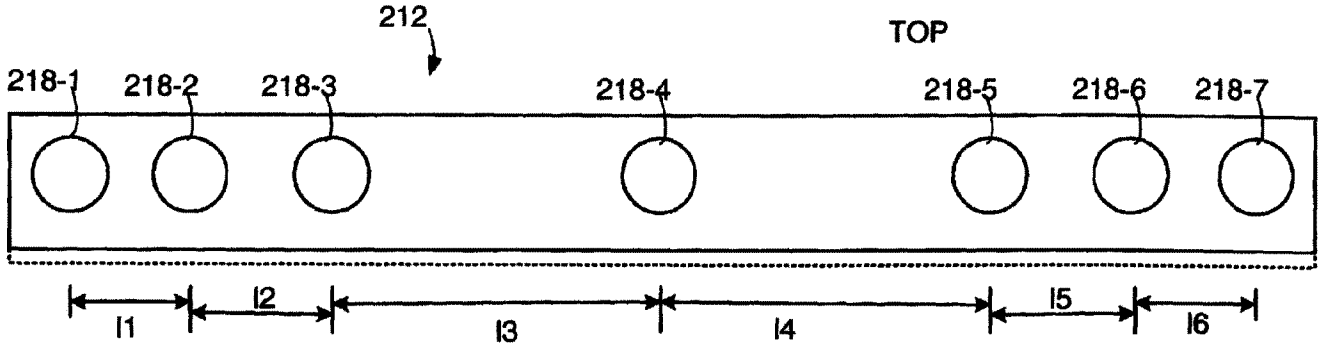

PASSIVE DIRECTIONAL ACOUSTIC RADIATING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation-in-part of, and claims priority of, U.S. patent application Ser. No. 12/114,261, published as U.S. Published Pat. App. 2009-0274329 A1, entitled "Passive Directional Acoustic Radiating", filed May 2, 2008 by Ickler, et al.

BACKGROUND

This specification describes an audio system for a television employing directional audio devices.

SUMMARY

In one aspect an audio system includes at least a left channel, a right channel, and a center channel. The audio system includes a crossover network for separating the left channel, the right channel, and the center channel into low frequency content, midrange frequency content, and high frequency content; an omnidirectional acoustical device for radiating acoustic energy corresponding to the low frequency content of the combined left channel, right channel, and center channel; a first directional array for radiating acoustic energy, comprising signal processing circuitry and more than one acoustic driver, for radiating acoustic energy corresponding to the midrange content of one of the left channel and right channel signal so that more acoustic energy corresponding to the midrange content of one of the left channel signal and the right channel signal is radiated laterally than in other directions; and a first passive directional device, for radiating acoustic energy corresponding to the high frequency content of the one of the left channel and right channel signal so that more acoustic energy corresponding to the high frequency content of the one of the left channel signal and the right channel signal is radiated laterally than in other directions. The audio system may include a second directional array for radiating acoustic energy, comprising signal processing circuitry and more than one acoustic driver for radiating acoustic energy corresponding to the midrange content of the other of the left channel and right channel so that more acoustic energy corresponding to high frequency content of the other of the left channel and right channel signal is radiated laterally than in other directions; and a second passive directional device, for radiating acoustic energy corresponding to the midrange content of the other of the left channel and right channel so that more acoustic energy corresponding to high frequency content of the other of the left channel and right channel signal is radiated laterally than in other directions. The first directional array, the second directional array, the first passive directional device and the second passive directional device may be mounted in a common enclosure. The common enclosure may be a television cabinet. The first directional array and the second directional array may include at least one common driver. The audio system of may further include a third directional array for radiating acoustic energy, comprising signal processing circuitry and more than one acoustic driver for radiating acoustic energy corresponding to the midrange content of the center channel so that more acoustic energy corresponding to the center channel signal is radiated in a direction substantially orthogonal to the direction of greater radiation of the first directional array and the direction of greater radiation of the second directional array. The audio system may further include a non-directional high frequency acoustical device for radiating the high frequency content of the center channel. The non-directional high frequency device and the third directional array may positioned in a television on vertically opposite sides of a television screen. At least two of the first directional array, the second directional array, and the third directional array may include at least one acoustic driver in common. The direction substantially orthogonal to the direction of greater radiation of the first directional array and the direction of greater radiation of the second directional array is substantially upward. The direction substantially orthogonal to the direction of greater radiation of the first directional array and the direction of greater radiation of the second directional array may be substantially toward an intended listening area. The omnidirectional device may include a waveguide. The waveguide may be mounted in a television cabinet. At least two of the first directional array, the second directional array, and the third directional array include more than one acoustic driver in common. The first directional array, the second directional array, and the third directional array may include more than one acoustic driver in common. The audio system may be mounted in a television cabinet. The omnidirectional acoustical device, the first directional array, the second directional array, the third directional array, the first passive directional device, and the second passive directional device each have an exit through which acoustic energy is radiated to the environment, and none of the exits may be in a front face of the television cabinet. The first passive directional device may include a slotted pipe type passive directional acoustic device comprising an acoustic driver, acoustically coupled to a pipe to radiate acoustic energy into the pipe. The pipe may include an elongated opening along at least a portion of the length of the pipe; and acoustically resistive material in the opening through which pressure waves are radiated to the environment. The pressure waves characterized by a volume velocity. The pipe, the opening, and the acoustically resistive material may be configured so that the volume velocity is substantially constant along the length of the pipe.

In another aspect, a method for operating an audio system comprising at least a left channel, a right channel, and a center channel, includes radiating omnidirectionally acoustic energy corresponding to the low frequency content of the combined left channel, right channel, and center channel; radiating directionally, from a first directional array comprising signal processing circuitry and more than one acoustic driver, acoustic energy corresponding to the midrange content of the left channel so that more acoustic energy corresponding to the left channel signal is radiated leftwardly than in other directions; radiating directionally, from a second directional array comprising signal processing circuitry and more than one acoustic driver, acoustic energy corresponding to the midrange content of the right channel so that more acoustic energy corresponding to the right channel signal is radiated rightwardly than in other directions; radiating directionally, from a third directional array comprising signal processing circuitry and more than one acoustic driver, acoustic energy corresponding to the midrange content of the center channel so that more acoustic energy corresponding to the center channel signal is radiated in a direction substantially orthogonal to the direction of greater radiation of the first directional array and the direction of greater radiation of the second directional array; radiating directionally, from a first passive directional device, acoustic energy corresponding to the high frequency content of the left channel so that more acoustic energy is radiated leftwardly than other directions; and radiating directionally, from a second passive directional device, acoustic energy corresponding to the high frequency content of the right channel so that more acoustic energy is radiated rightwardly than other directions. The method may further include radiating non-directionally the high the high frequency content of the center channel. Radiating non-directionally the high frequency content of the center channel may include radiating from a vertically opposite side of a television screen from the radiating directionally of the midrange content of the center channel. The radiating omnidirectionally acoustic energy corresponding to the low frequency content of the combined left channel, right channel, and center channel may include radiating from a waveguide. 2.2.1. The radiating omnidirectionally may include radiating from a waveguide is mounted in a television cabinet. The directionally radiating in a direction substantially orthogonal to the direction of greater radiation of the first directional array and the direction of greater radiation of the second directional array may include radiating substantially upward. The directionally radiating in a direction substantially orthogonal to the direction of greater radiation of the first directional array and the direction of greater radiation of the second directional array may include radiating substantially toward an intended listening area. The radiating directionally from a first directional array, the radiating directionally from a second directional array, the radiating directionally from a third directional array, the radiating directionally from a first passive directional device and the radiating directionally from a second passive directional device may include radiating from a television cabinet. The radiating directionally from a first directional array, the radiating directionally from a second directional array, the radiating directionally from a third directional array, the radiating directionally from a first passive directional device and the radiating directionally from a second passive directional device may include radiating from one of a side, a bottom, or a top of a television cabinet.

In another aspect, an audio system for a television may include a television cabinet; a slotted pipe type passive directional acoustic device that includes an acoustic driver, acoustically coupled to a pipe to radiate acoustic energy into the pipe. The pipe may include an elongated opening along at least a portion of the length of the pipe; and acoustically resistive material in the opening through which pressure waves are radiated to the environment. The pressure waves may be characterized by a volume velocity. The pipe, the opening, and the acoustically resistive material may be configured so that the volume velocity is substantially constant along the length of the pipe. The passive directional acoustic device may be mounted in the television cabinet to directionally radiate sound waves laterally from the television cabinet. the pipe may be at least one of bent or curved. The opening may be at least one of bent or curved along its length. The opening may be in a face that is bent or curved. The television cabinet may be tapered backwardly, and the passive directional acoustic device may be mounted so that a curved or bent wall of the slotted pipe type passive directional acoustic device is substantially parallel to the back and a side wall of the television cabinet. The opening may include two sections, a first section in a top face of the pipe and a second section in a side face of the pipe. The audio system for a television of claim 10.0, wherein the acoustic apparatus may be for radiating the high frequency content of a left channel or a right channel laterally from the television. The passive directional acoustic device may be for radiating the left channel or right channel content above 2 kHz. The audio system may further include a directional array for radiating midrange frequency content of the left channel or right channel laterally from the television. The audio system may further include a waveguide structure for radiating bass frequency content of the left channel or right channel; the other of the left channel or right channel; and a center channel. The cross sectional area of the pipe may decrease along the length of the pipe. The audio system may further include The audio system may further include a second slotted pipe type passive directional acoustic device comprising a second acoustic driver, acoustically coupled to a pipe to radiate acoustic energy into the pipe. The second pipe may include an elongated opening along at least a portion of the length of the pipe; and acoustically resistive material in the opening through which pressure waves are radiated to the environment. The pressure waves may be characterized by a volume velocity. The pipe, the opening, and the acoustically resistive material may be configured so that the volume velocity is substantially constant along the length of the pipe. The first passive directional acoustic device may be mounted in the television cabinet to directionally radiate sound waves laterally leftward from the television cabinet and the second passive radiator may be mounted in the television cabinet to directionally radiate sound waves laterally rightward from the television cabinet.

Other features, objects, and advantages will become apparent from the following detailed description, when read in connection with the following drawing, in which:

BRIEF DESCRIPTION OF THE SEVERAL VIEWS OF THE DRAWING

FIG. 5 is a diagrammatic view of the audio module;

DETAILED DESCRIPTION

Figure 1A:
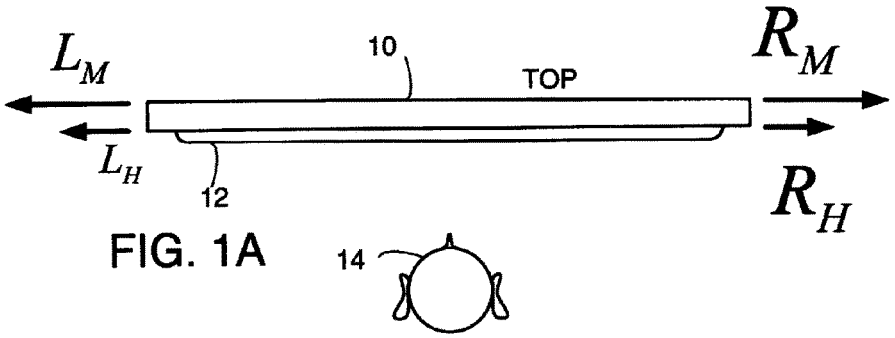
FIGS. 1A. 1C, and 1E are top diagrammatic views of an audio module mounted in a television.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. One element may perform the activities of more than one block. Unless otherwise indicated, audio signals or video signals or both may be encoded and transmitted in either digital or analog form; conventional digital-to-analog or analog-to-digital converters may not be shown in the figures. For simplicity of wording "radiating acoustic energy corresponding to the audio signals in channel x" will be referred to as "radiating channel x." "Directional arrays", as used herein, refers to arrays that use a combination of signal processing and geometry, placement, and configuration of more than one acoustic driver to cause the radiation to be greater in some directions than in other directions. Directional arrays include interference arrays, such as described in U.S. Pat. No. 5,870,484 and U.S. Pat. No. 5,809,153. "Passive directional device", as used herein, refers to devices that do not use any signal processing, but rather use only mechanical or physical arrangements or devices to cause the radiation of wavelengths that are large (for example 2×) relative to the diameter of the radiating elements to be greater in some directions than in others. Passive directional devices could include acoustic lenses, horns, dipole radiators, or slotted pipe type directional devices shown below and in FIGS. 7A-7C and described in the corresponding portions of the specification.

FIG. 1A shows a diagrammatic view of an audio module 10. The audio module 10 may be associated with, or built into, a television 12. The audio module radiates acoustic signals of some frequency ranges corresponding to a audio system including at least a left channel, a right channel, and a center channel.

The left channel midrange ($L_M$) frequency sound is radiated by a directional array so that more acoustic energy is radiated laterally leftward relative to a listening area than in other directions as indicated. The right channel midrange ($R_M$) frequency sound is radiated by a directional array so that more acoustic energy is radiated laterally rightward than in other directions as indicated.

The left channel high ($L_H$) frequency sound is radiated by a passive directional device so that more acoustic energy is radiated laterally leftward than in other directions as indicated. The right channel high ($R_H$) frequency sound is radiated by a passive directional device so that more acoustic energy is radiated laterally rightward than in other directions as indicated.

Radiating the left and right channels directionally laterally causes more of radiation experienced by the listener to be indirect radiation than direct radiation or radiation of the left and right channels toward the listening area. Causing more of the radiation to be indirect radiation results in a more spacious acoustic image and permits the radiation of the left and right channels from a device in the lateral middle of the listening area.

FIGS. 1B-1E show different implementations of the radiation pattern of the center channel.

Figure 1B:
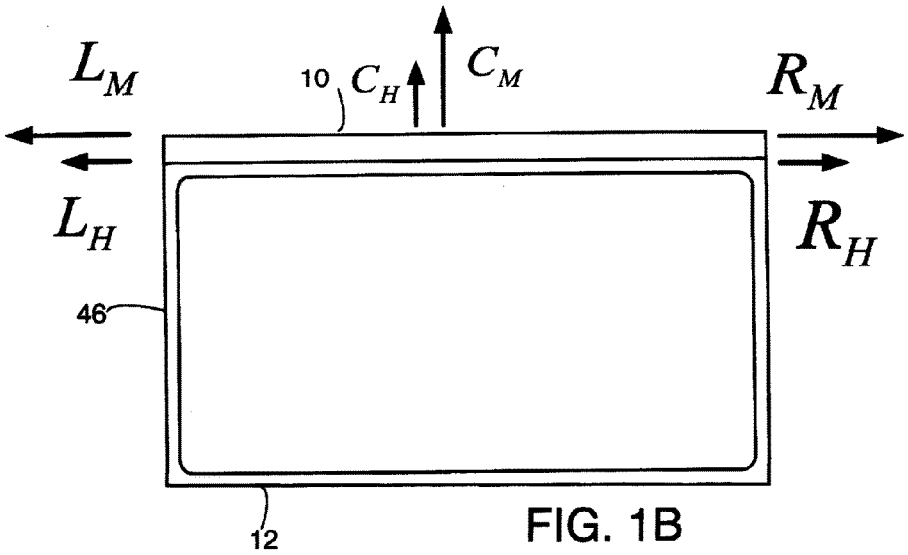
FIGS. 1B and 1D are front diagrammatic views of the audio module mounted in a television.
Figure 1C:
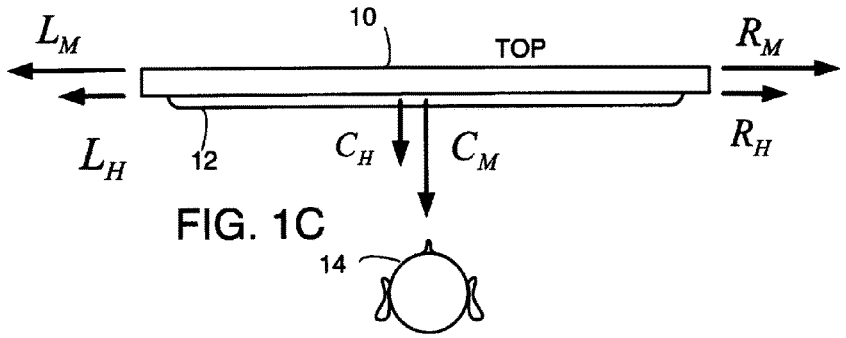

In FIGS. 1B and 1C, the center channel midrange ($C_M$) frequency sound is radiated by a directional array so that more energy is radiated in a direction substantially orthogonal to the directions of maximum radiation of the left and right channel midrange frequency sound than is radiated in other directions. The center channel high ($C_H$) frequency sound is radiated directionally by a passive directional device so that more energy is radiated in a direction substantially orthogonal to the directions of maximum radiation of the left and right channel midrange frequency sound than is radiated in other directions. In FIG. 1B, the direction of maximum radiation of the center channel midrange frequency sound and the high frequency sound is upward relative to the listening area. In FIG. 1C, the direction of maximum radiation the center channel midrange frequency sound and the high frequency sound is toward the listening area. In other implementations, the direction of maximum radiation of the center channel midrange frequency and the high frequency could be substantially downward. The direction of maximum radiation of the center channel midrange frequency sound and the direction of maximum radiation of the center channel high frequency sound do not need to be the same direction; for example, the center channel midrange frequency sound could be radiated substantially upwardly, and the center channel high frequency sound could be radiated substantially toward the listening area. The low frequency device, which will be described below, may be mounted in a television cabinet 46.

Figure 1D:
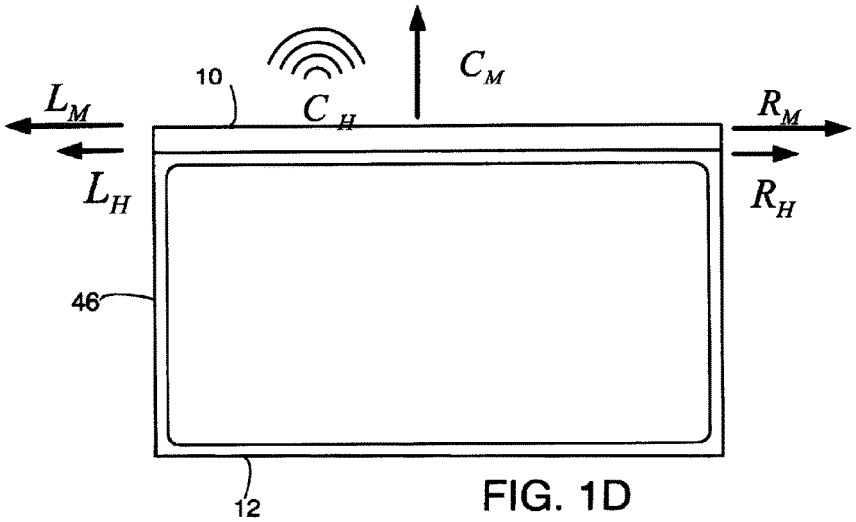
Figure 1E:
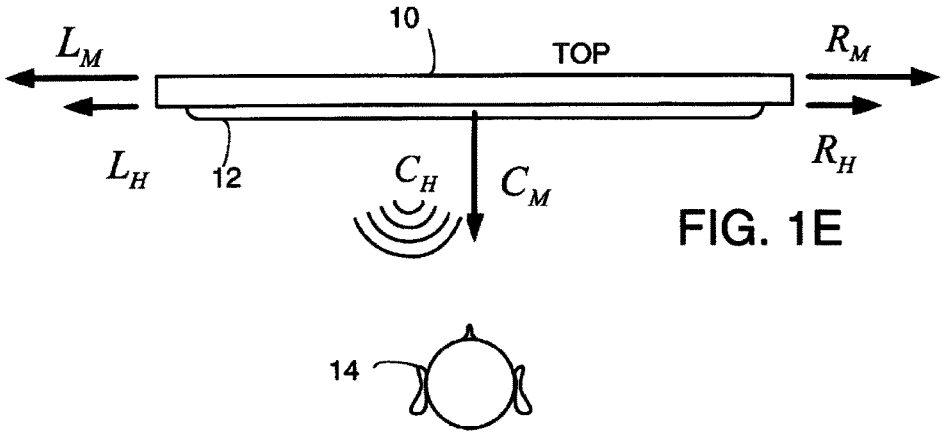

In FIGS. 1D and 1E, the center channel midrange frequency sound is radiated by a directional array so that more energy is radiated in a direction substantially orthogonal to the directions of maximum radiation of the left and right channel midrange frequency sound than is radiated in other directions. The center channel high frequency sound is radiated substantially omnidirectionally. In FIG. 1D, the direction of maximum radiation the center channel midrange frequency is upward relative to the listening area. In FIG. 1E, the direction of maximum radiation the center channel midrange frequency sound is toward the listening area.

Figure 2:
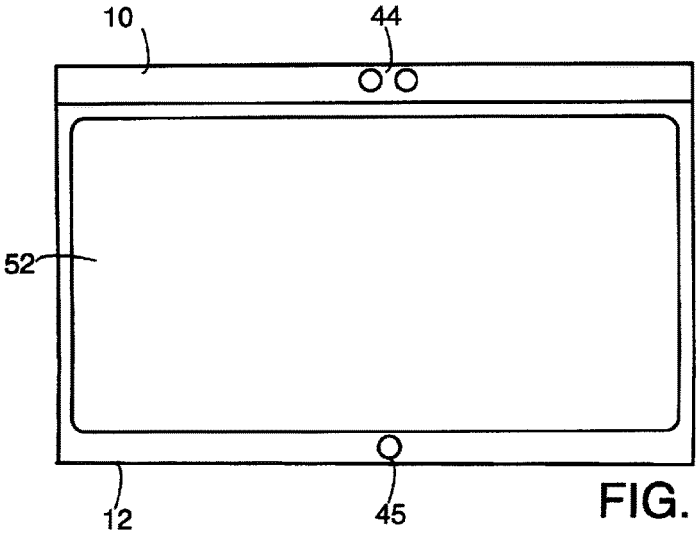
FIG. 2 is a front diagrammatic view of the audio module, showing the location of the center channel speakers.

When implemented in a television, the center channel high frequency acoustical device may be vertically on the opposite side of the television screen from the center channel directional array to cause the acoustic image to be vertically centered on the television screen. For example, as shown in FIG. 2, if the center channel directional array 44 is above the television screen 52, the center channel high frequency acoustical device 45 may be positioned below the television screen.

Figure 3A:
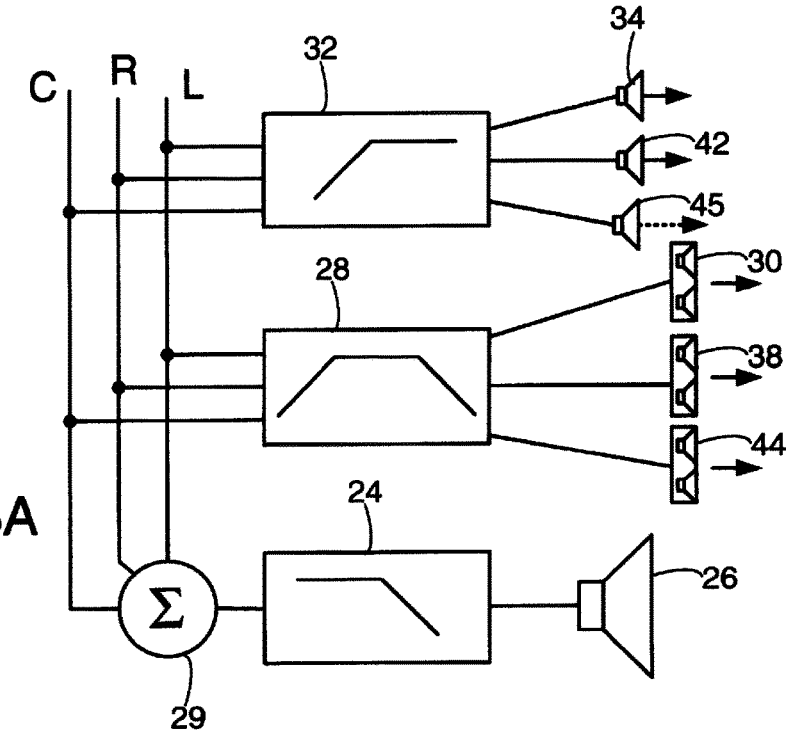
FIG. 3A is a block diagram of an audio system.

FIG. 3A is a block diagram showing some signal processing elements of the audio module 10 of FIGS. 1A-1E. The signal processing elements of FIG. 3A are parts of a three-way crossover system that separates the input channel into three frequency bands (hereinafter referred to as a bass frequency band, a midrange frequency band, and a high frequency band), none of which are substantially encompassed by any of the other frequency bands. The signal processing elements of FIG. 3A processes and radiates the three frequency bands differently.

Figure 3B:
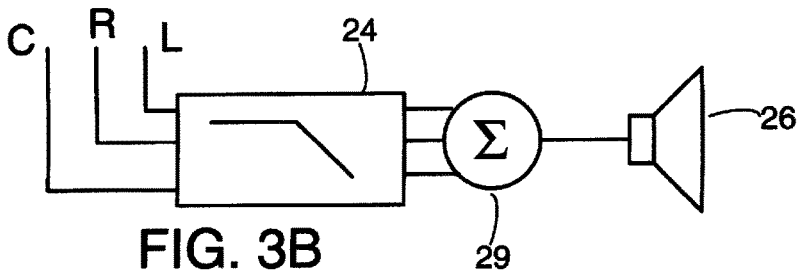
FIG. 3B is a block diagram showing an alternate configuration of some of the elements of the audio system of FIG. 3A.

The left channel signal L, the right channel signal R, and the center channel signal C are combined at signal summer 29 and low pass filtered by low pass filter 24 to provide a combined low frequency signal. The combined low frequency signal is radiated by a low frequency radiation device 26, such as a woofer or another acoustic device including low frequency augmentation elements such as ports, waveguides, or passive radiators. Alternatively, the left channel signal, the right channel signal, and the center channel signal may be low pass filtered, then combined before being radiated by the low frequency radiation device, as shown in FIG. 3B.

In FIG. 3A, the left channel signal is band pass filtered by band pass filter 28 and radiated directionally by left channel array 30. The left channel signal is high pass filtered by high pass filter 32 and radiated directionally (as indicated by the arrow extending from element 34) by passive directional device 34.

The right channel signal is band pass filtered by band pass filter 28 and radiated directionally by right channel array 38 as shown in FIGS. 1A-1E. The right channel signal is high pass filtered by high pass filter 32 and radiated directionally by passive directional device 42.

The center channel signal is band pass filtered by band pass filter 28 and radiated directionally by center channel array 44 as shown in FIGS. 1B-1E. The center channel signal is high pass filtered by high pass filter 32 and radiated directionally by a high frequency acoustical device 45 (which, as stated above may be directional or omnidirectional, as indicated by the dotted line arrow extending from element 45).

In one implementation, the break frequency of low pass filter 24 is 250 Hz, the pass band for band pass filter 28 is 250 Hz to 2.5 k Hz, and the break frequency for high pass filter 32 is 2 kHz.

Figure 4A:
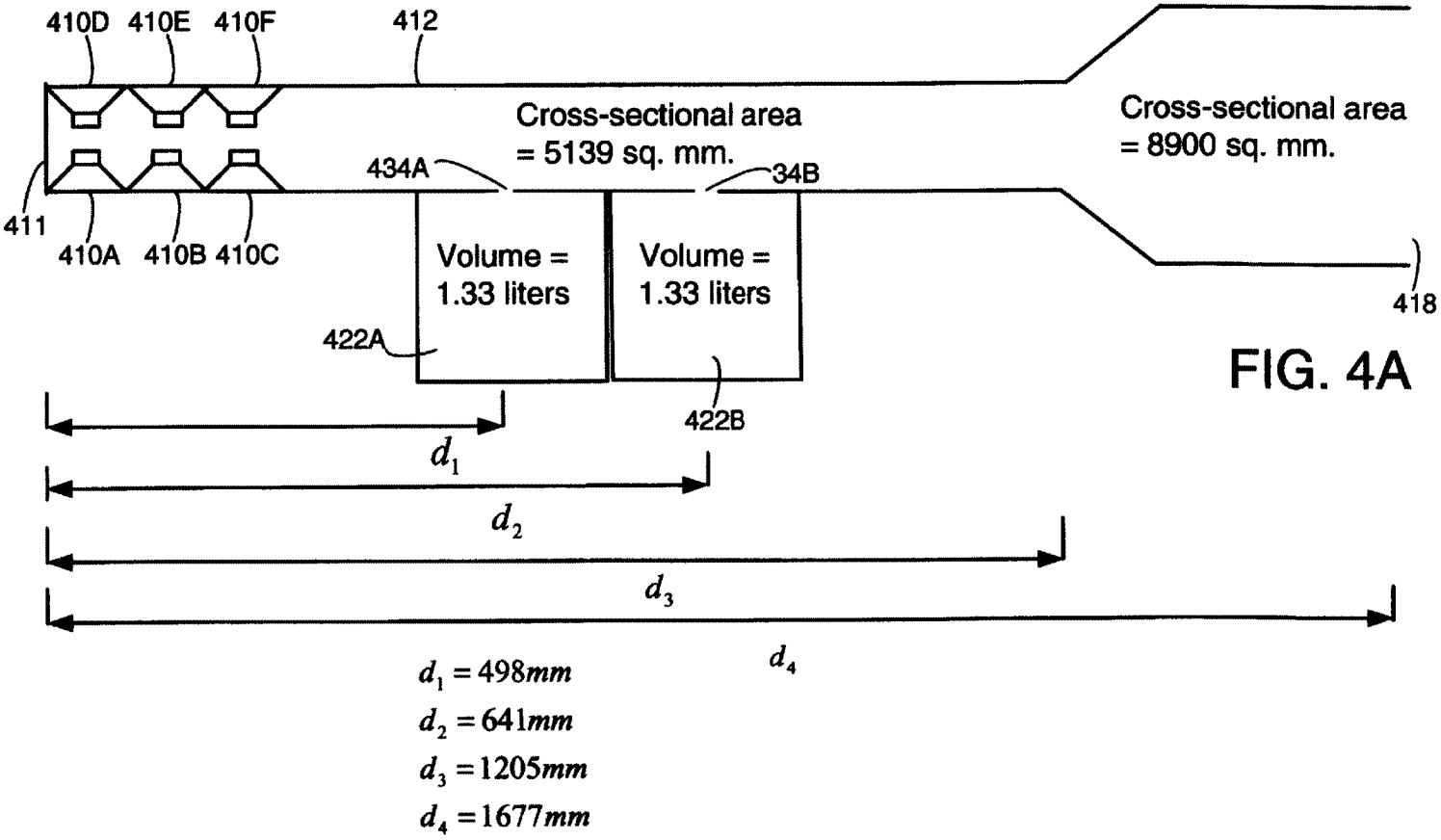
FIG. 4A is a diagrammatic view of a low frequency device of the audio system.
Figure 4B:
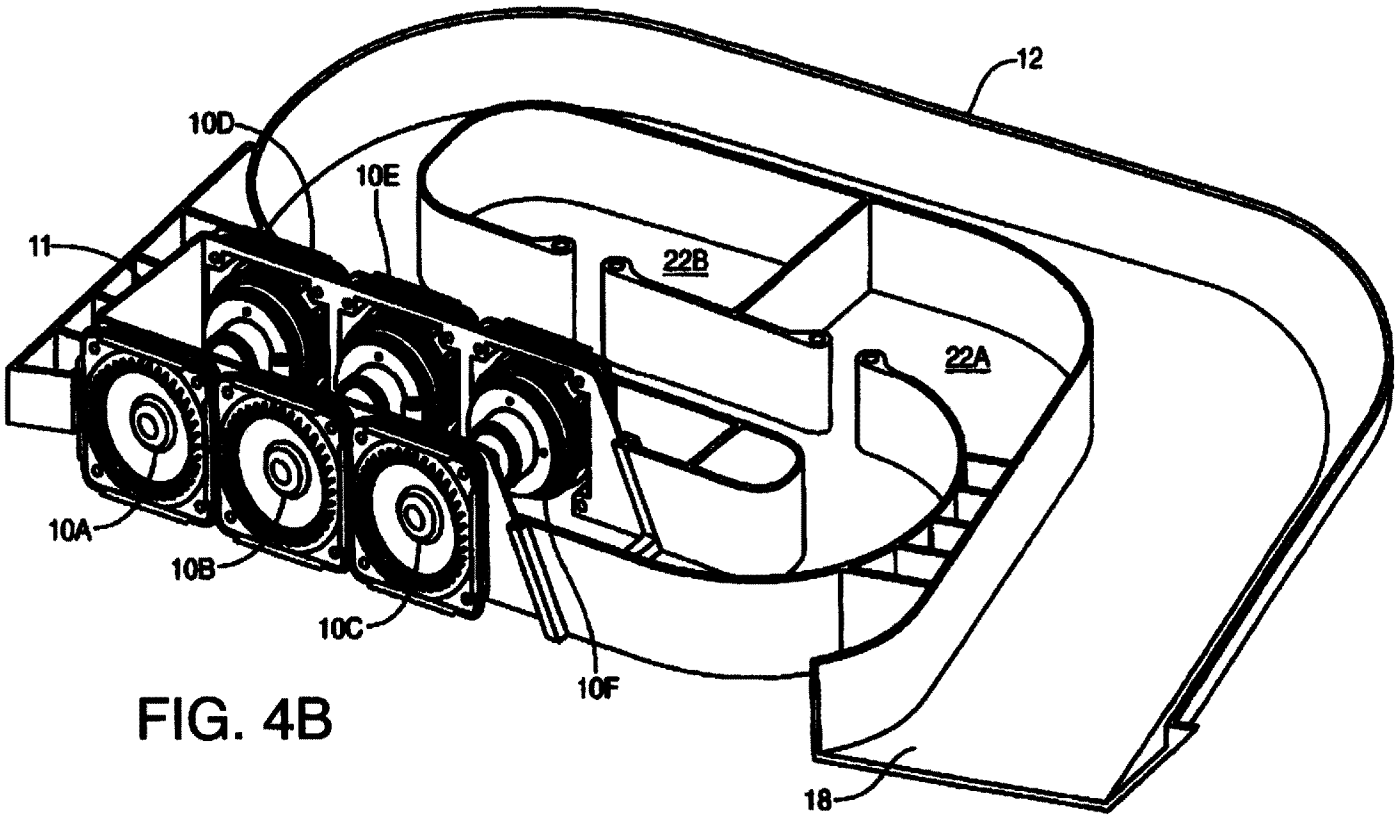
FIG. 4B is an isometric drawing of an actual implementation of the audio system.

In one implementation, the low frequency device 26 of FIG. 3A includes a waveguide structure as described in U.S. Published Pat. App. 2009-0214066 A1, incorporated herein by reference in its entirety. The waveguide structure is shown diagrammatically in FIG. 4A. An actual implementation of the low frequency device of FIG. 4A is shown in FIG. 4B. Reference numbers in FIG. 4B correspond to like numbered elements of FIG. 4A. The low frequency device may include a waveguide 412 driven by six 2.25 inch acoustic drivers 410A-410D mounted near the closed end 411 of the waveguide. There are acoustic volumes 422A and 422B acoustically coupled to the waveguide at the locations 434A and 434B along the waveguide. The cross sectional area of the waveguide increases at the open end 418. The implementation of FIG. 4B has one dimension that is small relative to the other two dimensions and can be conveniently enclosed in a flat panel wide screen television cabinet, such as the cabinet 46 of the television 12.

Directional arrays 30, 38, and 44 are shown diagrammatically in FIG. 3A as having two acoustic drivers. In actual implementations, they may have more than two acoustic drivers and may share common acoustic drivers. In one implementation, the left directional array 30, the right directional array 38, and the center directional array 44 are implemented as a multi-element directional array such as is described in U.S. patent application Ser. No. 12/716,309 filed Mar. 3, 2010 by Berardi, et al., incorporated herein by reference in its entirety.

FIG. 5 shows an acoustic module that is suitable for the left channel array 30, the right channel array 38 of FIG. 3A, and the center channel array 44 (all shown in FIG. 3A). An audio module 212 includes a plurality, in this embodiment seven, of acoustic drivers 218-1-218-7. One of the acoustic drivers 218-4 is positioned near the lateral center of the module, near the top of the audio module. Three acoustic drivers 218-1-218-3 are positioned near the left extremity 220 of the audio module and are closely and non-uniformly spaced, so that distance $l1 \neq l2$, $l2 \neq l3$, $l1 \neq 3$. Additionally, the spacing may be arranged so that $l1 < l2 < l3$. Similarly, distance $l6 \neq l5$, $l5 \neq l4$, $l6 \neq 4$. Additionally, the spacing may be arranged so that $l6 < l5 < l4$. In one implementation, $l1 = l6 = 55$ mm, $l2 = l5 = 110$ mm, and $l3 = l4 = 255$ mm. The left channel array 30, the right channel array 38, and the center channel array 44 of FIG. 3A each include subsets of the seven acoustic drivers 218-1-218-7.

The directional radiation patterns of the midrange frequency bands of FIGS. 1A-1E are accomplished by interference type directional arrays consisting of subsets of the acoustic drivers 218-1-218-7. Interference type directional arrays are discussed in U.S. Pat. No. 5,870,484 and U.S. Pat. No. 5,809,153. At frequencies at which the individual acoustic drivers radiate substantially omnidirectionally (for example frequencies with corresponding wavelengths that are more than twice the diameter of the radiating surface of the acoustic drivers), radiation from each of the acoustic drivers interferes destructively or non-destructively with radiation from each of the other acoustic drivers. The combined effect of the destructive and non-destructive interference is that the radiation is some directions is significantly less, for example, −14 dB, relative to the maximum radiation in any direction. The directions at which the radiation is significantly less than the maximum radiation in any direction may be referred to as "null directions". Causing more radiation experienced by a listener to be indirect radiation is accomplished by causing the direction between the audio module and the listener to be a null direction and so that more radiation is directed laterally relative to the listener.

Figure 6A:
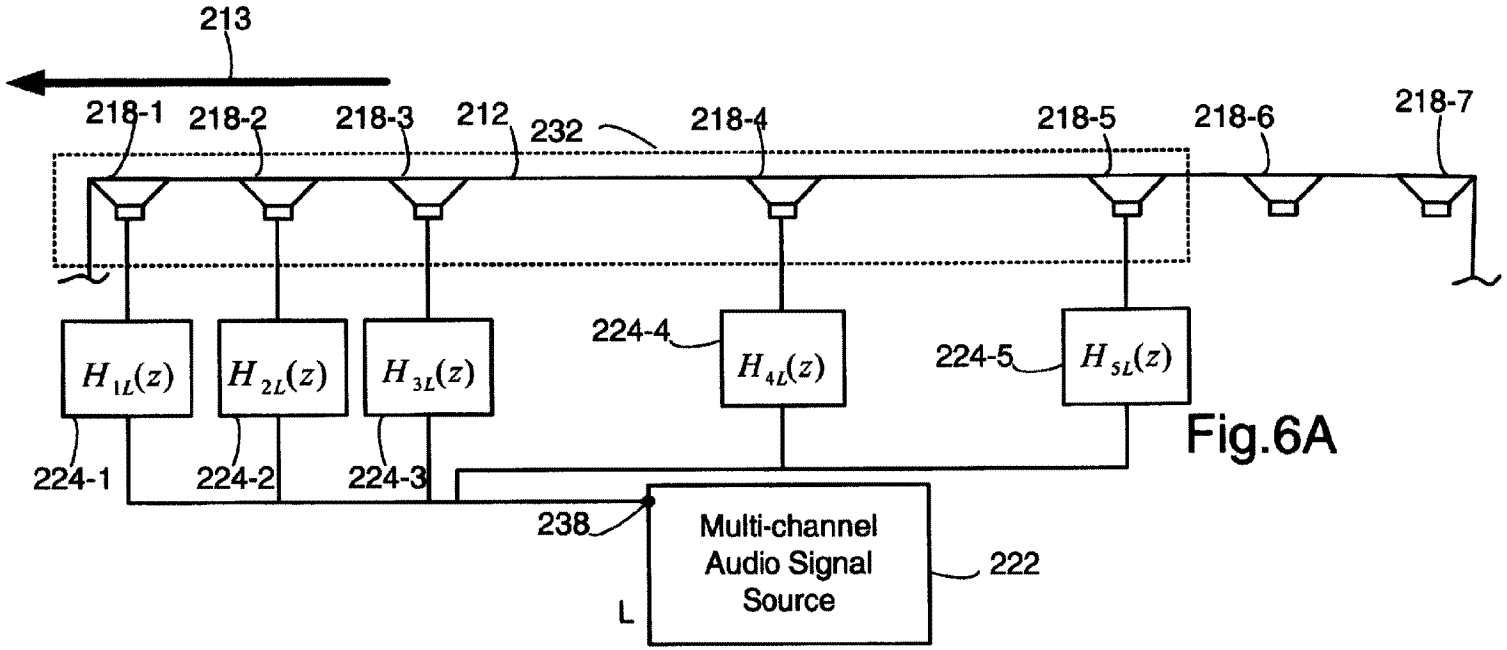
FIGS. 6A-6D are diagrammatic views of the elements of the audio module used as directional arrays.

FIG. 6A shows a diagrammatic view of audio module 212, showing the configuration of directional arrays of the audio module. The audio module is used to radiate the channels of a multi-channel audio signal source 222. Typically, a multi-channel audio signal source for use with a television has at least a left (L), right (R), and Center (C) channel. In FIG. 6A, the left channel array 30 includes acoustic drivers 218-1, 218-2, 218-3, 218-4, and 218-5. The acoustic drivers 218-1-218-5 are coupled to the left channel signal source 238 by signal processing circuitry 224-1-224-5, respectively that apply signal processing represented by transfer function $H_{1L}(z)$-$H_{5L}(z)$, respectively. The effect of the transfer functions $H_{1L}(z)$-$H_{5L}(z)$ on the left channel audio signal may include one or more of phase shift, time delay, polarity inversion, and others. Transfer functions $H_{1L}(z)$-$H_{5L}(z)$ are typically implemented as digital filters, but may be implemented with equivalent analog devices.

In operation, the left channel signal L, as modified by the transfer functions $H_{1L}(z)$-$H_{5L}(z)$ is transduced to acoustic energy by the acoustic drivers 218-1-218-5. The radiation from the acoustic drivers interferes destructively and non-destructively to result in a desired directional radiation pattern. To achieve a spacious stereo image, the left array 232 directs radiation laterally toward the left boundary of the room as indicated by arrow 213 and cancels radiation toward the listener. The use of digital filters to apply transfer functions to create directional interference arrays is described, for example, in Boone, et al., Design of a Highly Directional Endfire Loudspeaker Array, J. Audio Eng. Soc., Vol 57. The concept is also discussed with regard to microphones van der Wal et al., Design of Logarithmically Spaced Constant Directivity-Directivity Transducer Arrays, J. Audio Eng. Soc., Vol. 44, No. 6, June 1996 (also discussed with regard to loudspeakers), and in Ward, et al., Theory and design of broadband sensor arrays with frequency invariant far-field beam patterns, J. Acoust. Soc. Am. 97 (2), February 1995. Mathematically, directional microphone array concepts may generally be applied to loudspeakers.

Figure 6B:
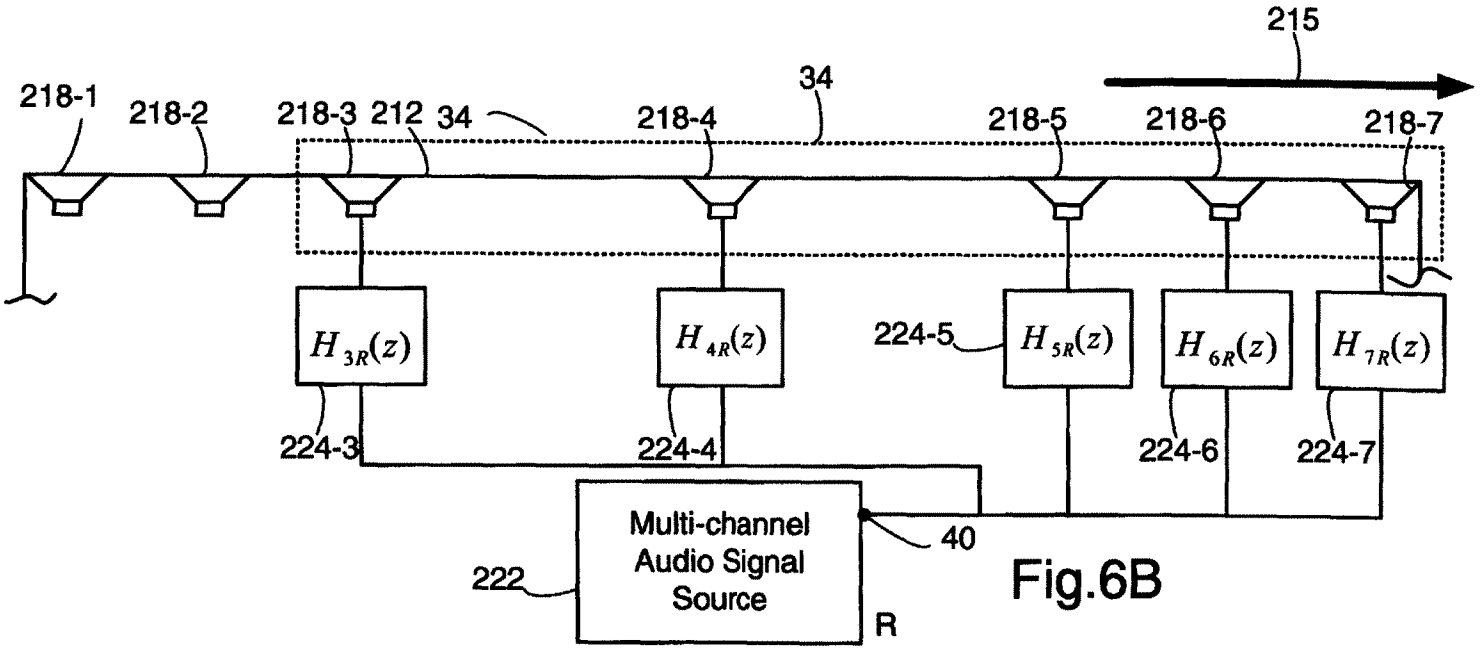

Similarly, in FIG. 6B, the right channel array 38 includes acoustic drivers 218-3, 218-4, 218-5, 218-6, and 218-7. The acoustic drivers 218-3-218-7 are coupled to the right channel signal source 240 and to signal processing circuitry 224-3-224-7, respectively that apply signal processing represented by transfer function $H_{3R}(z)$-$H_{7R}(z)$, respectively. The effect of the transfer functions $H_{3R}(z)$-$H_{7R}(z)$ may include one or more of phase shift, time delay, polarity inversion, and others. Transfer functions $H_{3R}(z)$-$H_{7R}(z)$ are typically implemented as digital filters, but may be implemented with equivalent analog devices.

In operation, the right channel signal R, as modified by the transfer functions $H_{3R}(z)$-$H_{7R}(z)$ is transduced to acoustic energy by the acoustic drivers 218-3-218-7. The radiation from the acoustic drivers interferes destructively and non-destructively to result in a desired directional radiation pattern. To achieve a spacious stereo image, the right array 234 directs radiation laterally toward the right boundary of the room as indicated by arrow 215 and cancels radiation toward the listener.

Figure 6C:
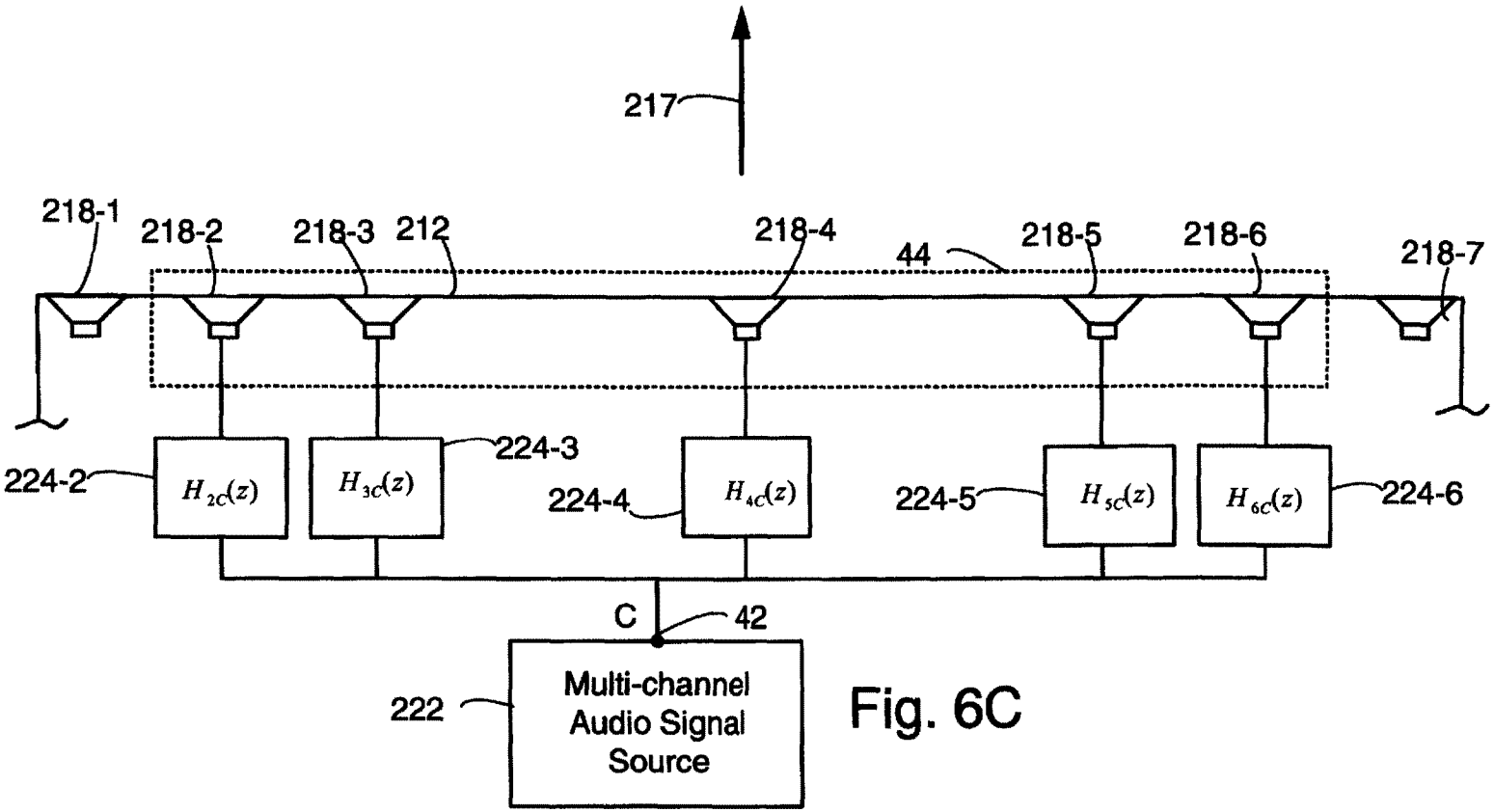

In FIG. 6C, the center channel array 44 includes acoustic drivers 218-2, 218-3, 218-4, 218-5, and 218-6. The acoustic drivers 218-2-218-6 are coupled to the center channel signal source 242 by signal processing circuitry 224-2-224-6, respectively that apply signal processing represented by transfer function $H_{2C}(z)$-$H_{6C}(z)$, respectively. The effect of the transfer functions $H_{2C}(z)$-$H_{6C}(z)$ may include one or more of phase shift, time delay, polarity inversion, and others. Transfer functions $H_{2C}(z)$-$H_{6C}(z)$ are typically implemented as digital filters, but may be implemented with equivalent analog devices.

In operation, the center channel signal C, as modified by the transfer functions $H_{2C}(z)$-$H_{6C}(z)$ is transduced to acoustic energy by the acoustic drivers 218-2-218-6. The radiation from the acoustic drivers interferes destructively and non-destructively to result in a desired directional radiation pattern.

Figure 6D:
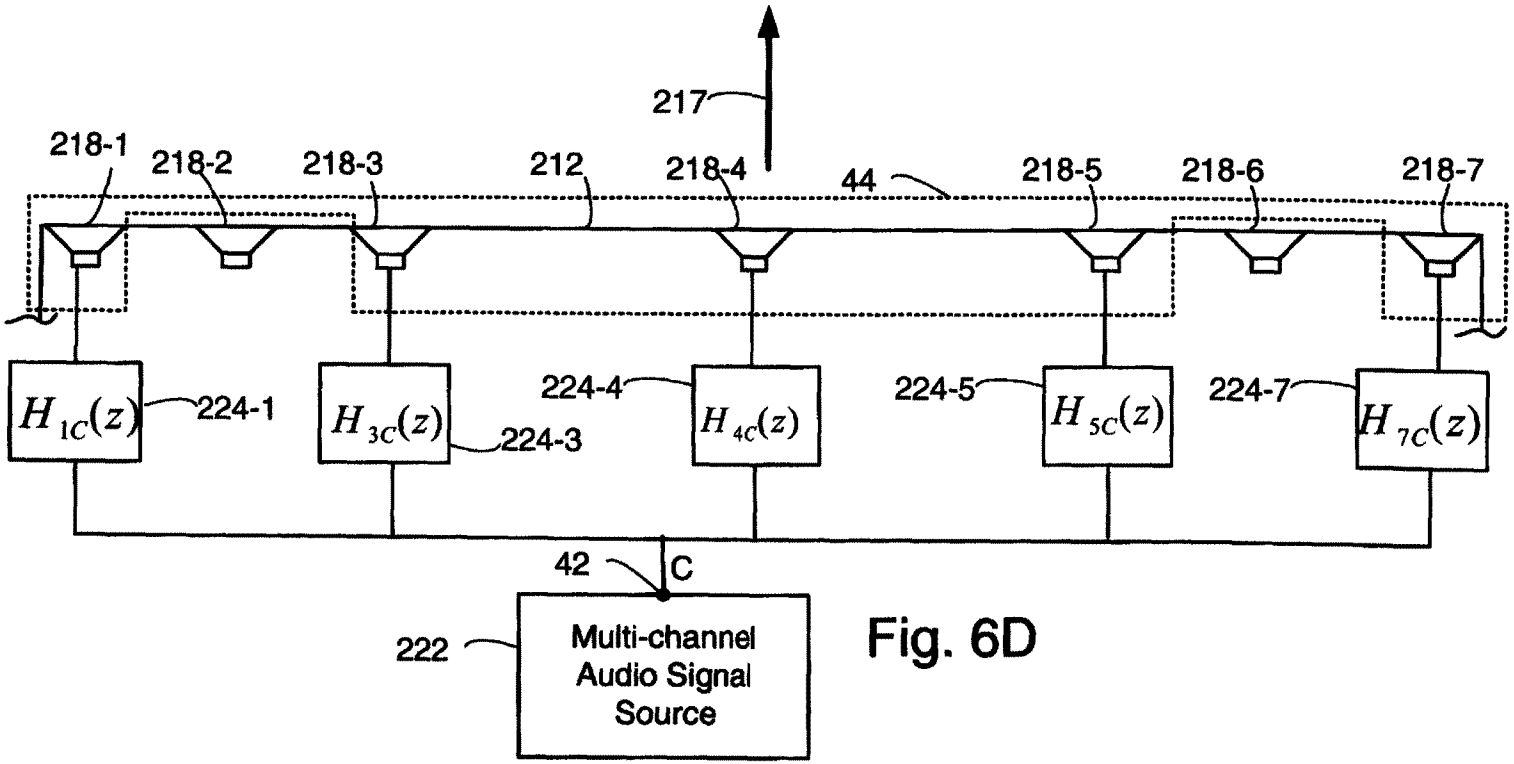

An alternative configuration for the center channel array 44 is shown in FIG. 6D, in which the center channel array 44 includes acoustic drivers 218-1, 218-3, 218-4, 218-5, and 218-7. The acoustic drivers 218-1, 218-3-218-5, and 218-7 are coupled to the center channel signal source 242 by signal processing circuitry 224-1, 224-3-224-5, and 224-7, respectively that apply signal processing represented by transfer function $H_{1C}(z)$, $H_{3C}(z)$-$H_{5C}(z)$, and $H_{7C}(z)$, respectively. The effect of the transfer functions $H_{1C}(z)$, $H_{3C}(z)$-$H_{5C}(z)$), and $H_{7C}(z)$, may include one or more of phase shift, time delay, polarity inversion, and others. Transfer functions $H_{1C}(z)$, $H_{3C}(z)$-$H_{5C}(z)$), and $H_{7C}(z)$ are typically implemented as digital filters, but may be implemented with equivalent analog devices.

In operation, the center channel signal C, as modified by the transfer functions $H_{1C}(z)$, $H_{3C}(z)$-$H_{5C}(z)$), and $H_{7C}(z)$ is transduced to acoustic energy by the acoustic drivers 218-1, 218-3-218-5, and 218-7. The radiation from the acoustic drivers interferes destructively and non-destructively to result in a desired directional radiation pattern.

The center channel array 44 of FIGS. 6C and 6D may direct radiation upward, as indicated by arrow 217 and in some implementations slightly backward and cancels radiation toward the listener, or in other implementations may direct radiation toward the listening area.

Other types of directional array are appropriate for use as directional arrays 30, 38, and 44. For example, each of the arrays may have as few as two acoustic drivers, without any acoustic drivers shared by arrays.

Figure 7A:
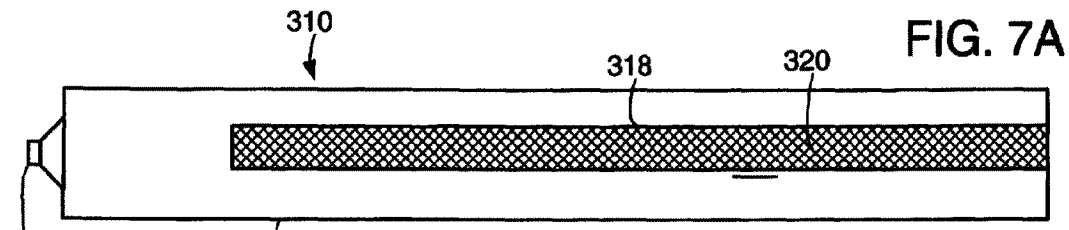
FIGS. 7A and 7B are diagrammatic views of a passive directional acoustic device.
Figure 7B:
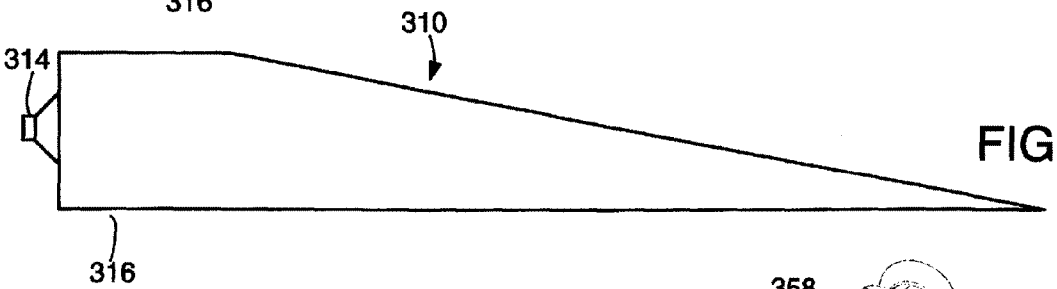
Figure 7C:
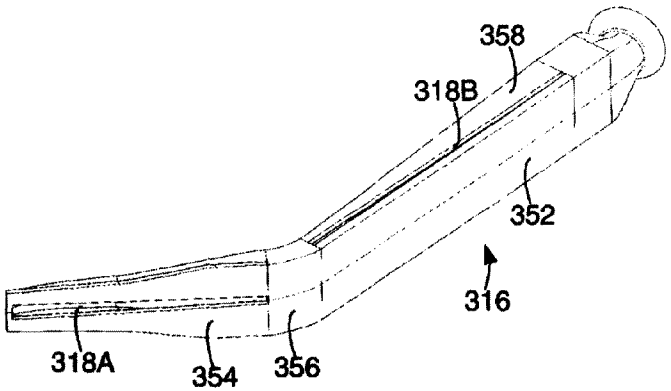
FIG. 7C is an isometric view of an actual implementation of the passive directional device of FIGS. 7A and 7B.

In one implementation, the left passive directional device 34 and the right passive directional device 42 of FIG. 3A are implemented as shown diagrammatically in FIGS. 7A and 7B with an actual example (without the acoustic driver) in FIG. 7C. The passive directional devices of FIGS. 7A and 7B operate according to the principles described in U.S. Published Pat. App. 2009-0274329 A1, incorporated herein by reference in its entirety.

The passive directional device 310 of FIGS. 7A and 7B includes a rectangular pipe 316 with an acoustic driver 314 mounted in one end. The pipe tapers from the end in which the acoustic driver 314 is mounted to the other end so that the cross-sectional area at the other end is substantially zero. A lengthwise slot 318 that runs substantially the length of the pipe is covered with acoustically resistive material 320, such as unsintered stainless steel wire cloth, 165×800 plain twill Dutch weave. The dimensions and characteristics of the pipe, the slot, and the acoustically resistive material are set so that the volume velocity is substantially constant along the length of the pipe.

In the actual implementation of FIG. 7C, one lengthwise section 354 of the rectangular pipe is bent at a 45 degree angle to a second section 352. The slot 318 of FIG. 7A is divided into two sections, one section 318A of the slot in the side face 356 of first section 354 of the pipe and a second section of the slot 318B in the top face 358 in the second section 352 of the pipe.

Figure 8:
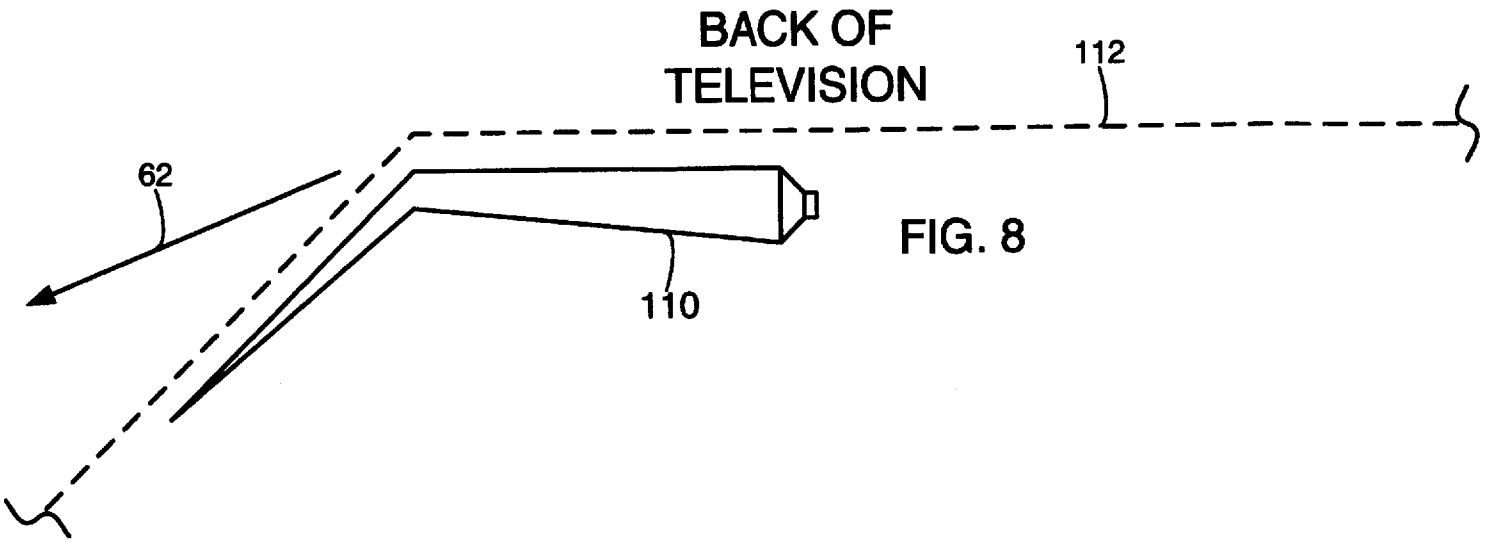
FIG. 8 is a diagrammatic view of a passive directional audio device, mounted in a television.

The implementation of the slotted pipe type directional loudspeaker of FIG. 7B is particularly advantageous in some situations. FIG. 8 shows a curved or bent slotted pipe type directional radiator 110 in a television cabinet 112. The dotted lines represent the side and back of the television cabinet 112, viewed from the top. For cosmetic or other reasons, the back of the cabinet is tapered inwardly, so that the back of the cabinet is narrower than the front. A slotted pipe type directional radiator is positioned in the cabinet so that the curve or bend generally follows the tapering of the cabinet, or in other words so that the curved or slanted wall of the slotted pipe type directional radiator is substantially parallel with the back and side of the television cabinet. The directional radiator may radiate through an opening in the side of the cabinet, which may, for example, be a louvered opening. The direction of strongest radiation of the directional loudspeaker is generally sideward and slightly forward as indicated by arrow 62, which is desirable for use as passive directional devices such as devices 32 and 42 of FIG. 3A.

Other types of passive directional devices may be appropriate for passive directional devices 32 and 42, for example, horns, lenses or the like.

Using passive directional devices for high frequencies is advantageous because it provides desired directionality without requiring directional arrays. Designing directional arrays that work effectively at the short wavelengths corresponding to high frequencies is difficult. At frequencies with corresponding wavelengths that approach the diameter of the radiating elements, the radiating elements themselves may become directional.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

[1. An audio system for a television comprising:

a television cabinet;

a first slotted pipe type passive directional acoustic device comprising a first acoustic driver, acoustically coupled to a pipe to radiate acoustic energy into the pipe, the first pipe comprising an elongated opening along at least a portion of the length of the pipe; and acoustically resistive material in the opening through which pressure waves are radiated to the environment, the pressure waves characterized by a volume velocity, the pipe, the opening, and the acoustically resistive material configured so that the volume velocity of the pressure waves radiated to the environment from the pipe is substantially constant along the length of the pipe; and wherein the passive directional acoustic device is mounted in the television cabinet to directionally radiate sound waves laterally from the television cabinet.]

2. [The audio system for a television of claim 1,] *An audio system comprising:*

*a first slotted pipe type passive directional acoustic device comprising*

*a first acoustic driver, acoustically coupled to a slotted pipe to radiate acoustic energy into the slotted pipe, the first slotted pipe comprising*

*an elongated opening along at least a portion of the length of the slotted pipe; and*

*acoustically resistive material in the opening through which pressure waves are radiated to the environment,*

*the pressure waves characterized by a volume velocity, where the slotted pipe, the opening, and the acoustically resistive material are configured so that volume velocity of the pressure waves is radiated to the environment from the slotted pipe along the length of the pipe, to directionally radiate sound waves laterally from the audio system,* wherein the *slotted* pipe is [at least one of bent or curved] *characterized by a central axis extending along the length of the slotted pipe, wherein the central axis of the slotted pipe is at least one of: bent and curved.*

3. The audio system [for a television] of claim 2 wherein the opening is at least one of bent or curved along its length.

4. The [slotted pipe type passive directional acoustic device] *audio system* of claim 2, wherein the opening is in a face that is bent or curved.

[5. The audio system for a television of claim 2, wherein the television cabinet is tapered backwardly, and wherein the passive directional acoustic device is mounted so that a curved or bent wall of the slotted pipe type passive directional acoustic device is substantially parallel to the back and a side wall of the television cabinet.]

6. The audio system [for a television] of claim 2, wherein the opening comprises two sections, a first section in a top face of the pipe and a second section in a side face of the pipe.

[7. The audio system for a television of claim 1, wherein the passive directional acoustic device is for radiating the high frequency content of a left channel or a right channel laterally from the television.]

[8. The audio system for a television of claim 7, wherein the acoustic device is for radiating the left channel or right channel content above 2 kHz.]

[9. The audio system for a television of claim 7, further comprising a directional array for radiating midrange frequency content of the left channel or right channel laterally from the television.]

[10. The audio system for a television of claim 9, further comprising a waveguide structure for radiating bass frequency content of the left channel or right channel;

the other of the left channel or right channel; and a center channel.]

[11. The audio system of claim 1, wherein the cross sectional area of the pipe decreases along the length of the pipe.]

[12. The audio system of claim 1, further comprising a second slotted pipe type passive directional acoustic device comprising a second acoustic driver, acoustically coupled to a pipe to radiate acoustic energy into the pipe, the second pipe comprising an elongated opening along at least a portion of the length of the pipe; and acoustically resistive material in the opening through which pressure waves are radiated to the environment, the pressure waves characterized by a volume velocity, the pipe, the opening, and the acoustically resistive material configured so that the volume velocity is substantially constant along the length of the pipe; and wherein the first passive directional acoustic device is mounted in the television cabinet to directionally radiate sound waves laterally leftward from the television cabinet and the second passive radiator is mounted in the television cabinet to directionally radiate sound waves laterally rightward from the television cabinet.]

*13. An acoustic apparatus, comprising:*

*an acoustic driver, acoustically coupled to a passive directional device to radiate acoustic energy into the passive directional device,*

*wherein the acoustic driver has a first radiating surface acoustically coupled to the first passive directional device and wherein the acoustic driver has a second radiating surface coupled to an acoustic device for radiating acoustic energy to the environment,*

*wherein the acoustic device comprises a structure to reduce high frequency radiation from the acoustic source to the environment;*

*wherein the cross sectional area of the passive directional device, normal to a central axis of the passive directional device, varies along the length of the passive directional device,*

*the passive directional device comprising an opening in the perimeter of the passive directional device extending along at least a portion of the length of the passive directional device through which acoustic energy is radiated to the environment, the opening characterized by an opening area,*

*wherein the opening has an acoustical resistance, and wherein substantially all of the acoustic energy radiated into the passive directional device by the acoustic driver exits the passive directional device through the opening or is dissipated in the acoustical resistance of the opening.*

*14. An acoustic apparatus in accordance with claim 13, wherein the cross sectional area of the passive directional device decreases with distance from the acoustic driver.*

*15. An acoustic apparatus in accordance with claim 14, wherein the acoustic pressure within the passive directional device produced by the acoustic energy radiated into the passive directional device by the acoustic driver is substan-*

*tially constant with distance from the acoustic driver, over at least a portion of the length of the passive directional device.*

*16. An acoustic apparatus in accordance with claim 13, wherein acoustically resistive material is located in the opening to provide acoustical resistance.*

*17. An acoustic apparatus in accordance with claim 16, wherein the acoustically resistive material is at least one of the group consisting of: wire mesh, felt, sintered plastic, woven fabric, and unwoven fabric.*

*18. An acoustic apparatus in accordance with claim 13, wherein the acoustic device is a second passive directional device comprising an opening extending along at least a portion of a length of the second passive directional device through which acoustic energy is radiated to the environment.*

*19. An acoustic apparatus, comprising:*

*an acoustic driver, acoustically coupled to a first end of a passive directional device to radiate acoustic energy into the passive directional device,*

*the passive directional device comprising an opening in the perimeter of the passive directional device, the opening extending along at least a portion of a length of the passive directional device through which acoustic energy is radiated to an environment, the opening characterized by an opening area,*

*wherein the passive directional device is characterized by a central axis extending along the length of the passive directional device, wherein the central axis of the passive directional device is at least one of: bent and curved,*

*wherein the opening has an acoustical resistance,*

*wherein the acoustical resistance of the opening varies with distance from the acoustic driver along the passive directional device, and*

*wherein the acoustic energy radiated into the passive directional device by the acoustic driver exits the passive directional device through the acoustical resistance of the opening, such that little acoustic energy remains within the passive directional device at a second end of the passive directional device.*

* * * * *